(12) United States Patent
Wollenstein et al.

(10) Patent No.: US 9,338,186 B2
(45) Date of Patent: May 10, 2016

(54) SYSTEMS AND METHODS FOR IMPLEMENTING CUSTOM PRIVACY SETTINGS

(71) Applicant: Lithium Technologies, Inc., San Francisco, CA (US)

(72) Inventors: Derek Alexander Wollenstein, Palo Alto, CA (US); Charles A. Ruhland, San Francisco, CA (US)

(73) Assignee: Lithium Technologies, Inc., San Francisco, CA (US)

(*) Notice: Subject to any disclaimer, the term of this patent is extended or adjusted under 35 U.S.C. 154(b) by 0 days.

(21) Appl. No.: 13/871,076

(22) Filed: Apr. 26, 2013

(65) Prior Publication Data

US 2013/0291058 A1    Oct. 31, 2013

Related U.S. Application Data

(60) Provisional application No. 61/639,509, filed on Apr. 27, 2012.

(51) Int. Cl.
*H04L 29/06* (2006.01)

(52) U.S. Cl.
CPC ..................... *H04L 63/20* (2013.01)

(58) Field of Classification Search
USPC .............................................. 726/1
See application file for complete search history.

(56) References Cited

U.S. PATENT DOCUMENTS

| | | | |
|---|---|---|---|
| 7,725,492 B2* | 5/2010 | Sittig et al. | 707/784 |
| 7,756,926 B2* | 7/2010 | Tseng et al. | 709/204 |
| 8,171,128 B2* | 5/2012 | Zuckerberg et al. | 709/224 |
| 8,225,376 B2* | 7/2012 | Zuckerberg et al. | 726/4 |
| 8,321,300 B1* | 11/2012 | Bockius et al. | 705/27.1 |
| 2008/0040673 A1* | 2/2008 | Zuckerberg et al. | 715/745 |
| 2009/0132311 A1* | 5/2009 | Klinger et al. | 705/7 |
| 2009/0249451 A1* | 10/2009 | Su et al. | 726/5 |
| 2011/0004922 A1* | 1/2011 | Bono et al. | 726/4 |
| 2011/0289574 A1* | 11/2011 | Hull et al. | 726/7 |

* cited by examiner

*Primary Examiner* — Amare F Tabor
(74) *Attorney, Agent, or Firm* — Taylor Russell & Russell, P.C.

(57) ABSTRACT

A social network aggregation platform collects user generated content from multiple disparate social network platforms. The platform includes methods and systems for maintaining and applying user-selected and/or platform-specific privacy settings to the content when distributed or published. User privacy settings are compiled across platforms and used as a filter list against user-generated content. As a content stream is ingested into a platform, the source(s) of the invention content items are checked and the appropriate privacy settings are applied.

17 Claims, 4 Drawing Sheets

| UID | Tag | SN1_Flag | SN2_Flag | Agg_Site_Flag |
|---|---|---|---|---|
| 5f581c253d5f780514f7354203313ada | @StevenWhite | Y | Y | N |
| e85a6ad07961bf474d671a68af7c7d7a | @MaryJones | Y | N | N |
| 003b91490015c14f69978255ee5d08ea | @LarrySmith | Y | Y | Y |

SYSTEMS AND METHODS FOR IMPLEMENTING CUSTOM PRIVACY SETTINGS

CROSS-REFERENCE TO RELATED APPLICATIONS

This application claims priority to and the benefits of U.S. provisional patent application Ser. No. 61/639,509, filed on Apr. 27, 2012, the entire disclosure of which are incorporated herein by reference.

FIELD OF THE INVENTION

The invention relates generally to the publishing of shared content across multiple disparate social networks and, more specifically, for identifying and implementing user-specific privacy policies on the shared content.

BACKGROUND

Social networking platforms such as Facebook, Google+, FourSquare, LinkedIn, and Twitter have become deeply embedded into the social fabric of modern day life. These platforms are used for a variety of reasons, ranging from individuals sharing daily activities and photos to corporations using them as valuable marketing and customer communication channels, and news agencies using them as a broadcast platform. While creating a basic account on each of these platforms is relatively straightforward, the options with regard to privacy soon become quite complex. Moreover, the processes for selecting and implementing one's preferred privacy settings change frequently and often without notice. For example, Facebook routinely changes how a user can implement certain privacy settings by implementing such features as allowing for a "per-post" sharing option (e.g., one can limit the viewing of a post to an individual or group), the degrees of separation (e.g., friends of friends) that can access or comment on content, as well as others.

Another common feature is the sharing of data from and among these disparate networks. This is implemented primarily through the use of application programming interfaces, or APIs, that provide access to the networks' databases on a push (updates are "pushed" to other applications) and/or pull (an application may periodically query another application) basis. Tweets, for example, created in Twitter are "posted" on the user's Facebook page. Updates to one's LinkedIn employment profile may show up as a status update in Google+. A check-in at a local restaurant on FourSquare may be posted as a tweet and as a status update on Twitter and Facebook simultaneously. As the content is shared on one platform and proliferates through others, users can comment on the content by adding text, images or other additional commentary, resulting in a "string" of user-generated content all falling under an initial post.

Recently, sites such as Klout, HootSuite, and Sprout Social have begun aggregating data fees from individual social network platforms onto a single platform. This process provides a "global" view of content and its creators and illustrates both how content proliferates across the web and how an individual's profile can appear in many places, often without their knowledge or permission. Moreover, it allows multiple users who otherwise might not be connected to view and possibly comment on content submitted by others. This creates a challenge, however, because while the content itself may be shared among these disparate applications, the posters' privacy settings that govern its display is not. This can result in the unintended publication of a comment and/or attribution of the content that was otherwise meant remain limited in its distribution.

There is a need, therefore, for methods and supporting systems that can identify, query, incorporate and implement privacy settings from multiple disparate social network platforms even as the content created in each platform is shared and aggregated across the web. Using such techniques would allow users to remain confident that the distribution of their commentary or other content will at all times be governed by their selected privacy settings, regardless of where that content was displayed.

SUMMARY OF THE INVENTION

The techniques and systems described herein allow social network aggregation platforms to collect user generated content from multiple disparate social network platforms and networks and maintain and apply user-selected and/or platform-specific privacy settings to the content when distributed or published. As a result, individual comments, images or other content that was added to a particular data stream or conversation that is visible to a particular population in one platform may (or in some cases may not) be available in another. In practice, user privacy settings (opt-in, opt-out, friends only, public, etc.) are compiled and used as a filter list against user-generated content. As a content stream is ingested into a platform, the source(s) of the invention content items are checked. If a source has indicated that they do not want their comments shared beyond a certain circle of individuals, or if they have opted out from the aggregation site generally, their contribution(s) to the content stream are removed and only a subset of the stream is available for publishing.

Therefore, in a first aspect, embodiments of the invention provide a method for publishing user-generated content consistent with multiple user-specified privacy settings. The method includes storing and executing computer-executable instructions for identifying and implementing user-specified privacy settings related to user-generated content and identified users having created the user-generated content. When executed, the instructions collect user-generated content from a plurality of social network platforms and identify user-specific information contained within or associated with the user-generated content. User-specified privacy policies associated with the identified users are applied to the content, and the content is altered such that the content does not violate the user-specified privacy policies.

The user-generated content, as well as the user-specific information may include, for example, textual comment(s), image(s), and/or a user identifier. The user-generated content and/or the user-specified privacy policies may be accessed and collected via application programming interfaces (APIs), which may, in certain instances, be provided by the respective social network platform from which the content and policies are collected.

The user-generated content may include user-specific information attributed to more than one identified user, and the user-specified privacy policies attributed to the identified users can contain dissimilar settings. The settings may differ with respect to the respective social network platforms, the respective identified users and/or different elements of the user-generated content.

Alteration of the content may, for example, include removal of one or more elements of user-specific information and/or the associated user identifier from the user-generated content such that the user-generated content is displayed without the removed user-specific information.

In another aspect, embodiments of the invention provide a system for administering a loyalty card program. The system includes a processor for executing computer-executable instructions and a memory for storing the instructions, resulting in an instantiation of a privacy policy enforcement application, wherein the privacy policy enforcement application identifies and implements user-specified privacy settings related to user-generated content and identified users having created the user-generated content. The application collects user-generated content from a plurality of social network platforms and identifies user-specific information contained within or associated with the user-generated content. User-specified privacy policies associated with the identified users are applied to the content, and the content is altered such that the content does not violate the user-specified privacy policies.

Alteration of the content may, for example, result in removal of certain elements of user-specific information and/or user identifiers associated with the information from the user-generated content such that the user-generated content is displayed without the removed user-specific information.

In some implementations, the system includes a data storage module for storing the collected user-generated content and the user-specified privacy settings related to the user-generated content. The system may also include a collection of application programming interfaces, each application programming interface being associated with at least one social network platform and used to collect user-generated content and user-specified privacy policies therefrom.

BRIEF DESCRIPTION OF FIGURES

In the drawings, like reference characters generally refer to the same parts throughout the different views. Also, the drawings are not necessarily to scale, emphasis instead generally being placed upon illustrating the principles of the invention.

FIG. 3 is an exemplary tabular listing of data privacy settings used in accordance with various embodiments of the invention.

DETAILED DESCRIPTION

Figure 1:
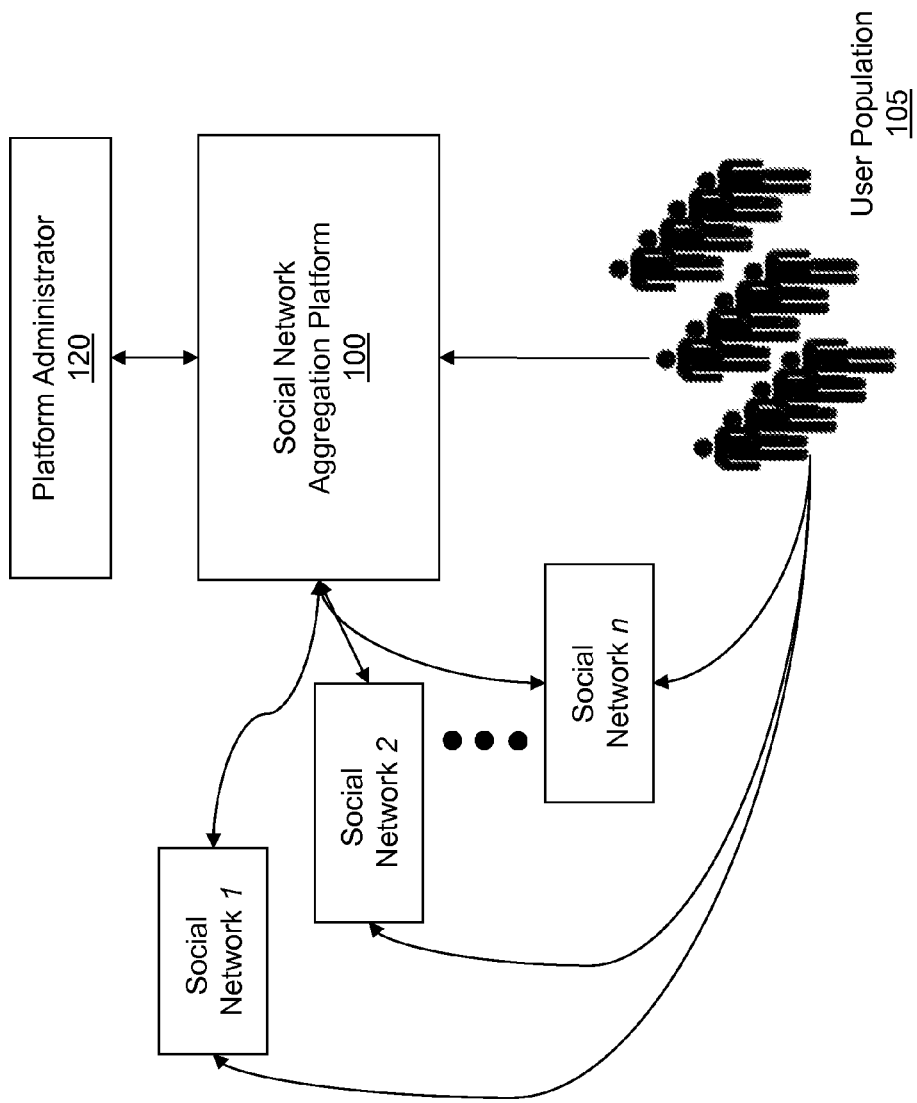
FIG. 1 is a diagram of the environment in which various embodiments of the invention operate.

FIG. 1 illustrates, generally, one exemplary environment in which various embodiments of the invention operate. A social network aggregation application platform 100 connects to and collects information from one or more distinct and disparate social networks (social network 1, social network 2 . . . social network n, and generally referred to as a social network). Although three are shown, it is understood that there is no limit to the number of networks from which the aggregation platform may collect data. Separately, users from a user population 105 subscribe to, join, or otherwise participate in one or more of the social networks for any reason. For example, a user may participate in a network such as Facebook to maintain personal relationships with friends and family members, to share photos, and receive content from news feeds and other sources. Similarly, a user may join LinkedIn to expand and exploit their professional network for business purposes. In each case, the user typically provides some information about themselves (user name, location, education, employment, interests, etc.) to assist the network in finding relevant information and/or other users with similar backgrounds.

While many individuals participate in multiple networks, the ability to see and react to data that may span multiple networks is difficult. Moreover, because many individuals contribute content to multiple different networks, identifying individuals that are truly influential on a particular topic can be challenging. As such, the aggregation platform brings together content and user data from multiple disparate social networks to address these issues. In doing so, however, special challenges arise with respect to the use of users' information and the adherence to their preferred privacy settings. A platform administrator 120 implements the techniques and systems described herein to operate the application platform 100.

Figure 2:
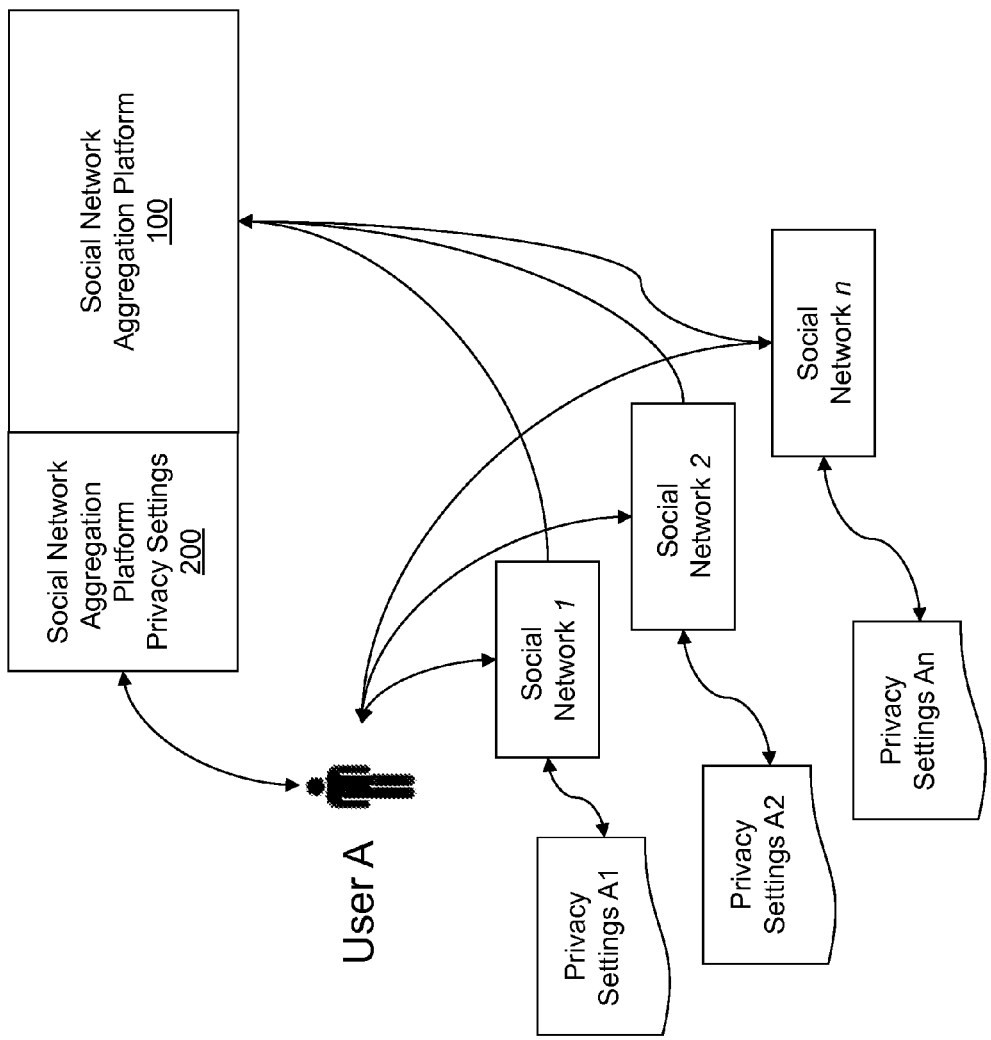
FIG. 2 is a diagram illustrating data flows among the various elements of the environment in which the invention operates.

Referring now to FIG. 2, and addressing the challenge noted above with respect to adherence to privacy policies, User A may participate in multiple social networks, each having a respective privacy policy and allowing User A to select, define or otherwise indicate their preferred privacy settings. For example, User A may wish to limit the availability of their personal information (date of birth, marital status, hometown, email address, etc.) to those individuals known to and approved by User A. Further, User A may wish to limit the viewing of certain content (e.g., posts, comments, photos, tweets, messages, etc.) to specific individuals or groups. The result of these selections is a particular privacy setting for that user on that network (e.g., setting A1 for user A on social network 1, setting A2 for user A on social network 2, etc.).

To consolidate and/or aggregate data across the multiple disparate networks, the social network aggregation platform 100 collects data from each network. The data may be collected, for example via one or more application programming interfaces (APIs). In some instances each social network may publish its own unique API, whereas in other cases certain networks may utilize a common API. In either case, the aggregation platform queries each individual social network using the appropriate API and receives user data and content. The scope of the user data received may be defined by certain policies of the individual networks, such as limiting user data to non-personally identifiable information, content only, or other constraints. In other cases, the scope of the data collected may be based on a combination of platform-wide policies (e.g., LinkedIn's API usage guidelines) and the individual user's preferences (John Smith has elected to have his information remain confidential).

More specifically, User A may decide that for a particular network that he uses all of his posts (content, images, comments on other posts, etc.) may be republished without restriction. For another network, however, the same user may decide that only certain individuals may see content he creates. For example, if User A uses the first network for professional purposes (e.g., to write articles, provide professional product reviews, and post-employment opportunities) and uses the second for personal enjoyment (posting pictures of children, commenting on a college buddy's bachelor party, etc.) he may have different privacy settings for the two networks. As such, User A is likely to want the privacy settings attributed to his ID and content to be respected regardless of where the data is published. Moreover, an aggregation platform may allow for additional content publishing and sharing restrictions that may affect who sees User A's content by allowing the user to restrict publication, attribution or identification of content on the aggregation site despite the settings in place on the underlying source networks.

As a result, and referring to FIG. 3, a dataset 300 of user IDs and privacy settings may be compiled and maintained that describes, generally, a user population's desired content sharing preferences across multiple disparate social networks, including a platform that collects and aggregates from each of the networks. The dataset may contain a unique user ID that is used to identify each user instance from each network. For example, the User ID field may contain a string generated by using a hash function against the user's nickname or tag and the network from which the user's information was collected. Such an approach allows for duplicate user names across multiple networks but guarantees uniqueness for any username/network combination. In some instances the dataset 300 may also contain the user's nickname or tag (e.g., @StevenWhite, or SteveWhite@gmail.com). For each network from which data is collected, certain privacy-related settings are also stored. In the example of FIG. 3, two different networks (SN1 and SN2) are identified such that each user has either a "Y" or "N" associate with that network, meaning the user either allows content from that network to be shared (Y) or does not (N). Furthermore, the dataset includes a field that stores the users' privacy selection for the aggregation platform itself (Agg_Site_Flag) such that the site will either share information it has access to (Y) or not (N). As a result, an application can access this data and use the privacy and content sharing settings to modify its content publishing and/or sharing practices to comply with multiple levels of source-independent user preferences.

Those skilled in the art will recognize that the structure and data shown in FIG. 3 is for illustrative purposes and is shown in simplified form. For example, the data may be stored in different logical tables or files and use various hash functions, data types, normalization algorithms and data structures to collect, store, update and retrieve such data. The data may be stored on a physical medium (e.g., an optical disk), in RAM for quicker access, or some combination of the two. In each case, the structure and storage means used to organize the data is not germane to the invention.

Figure 4:
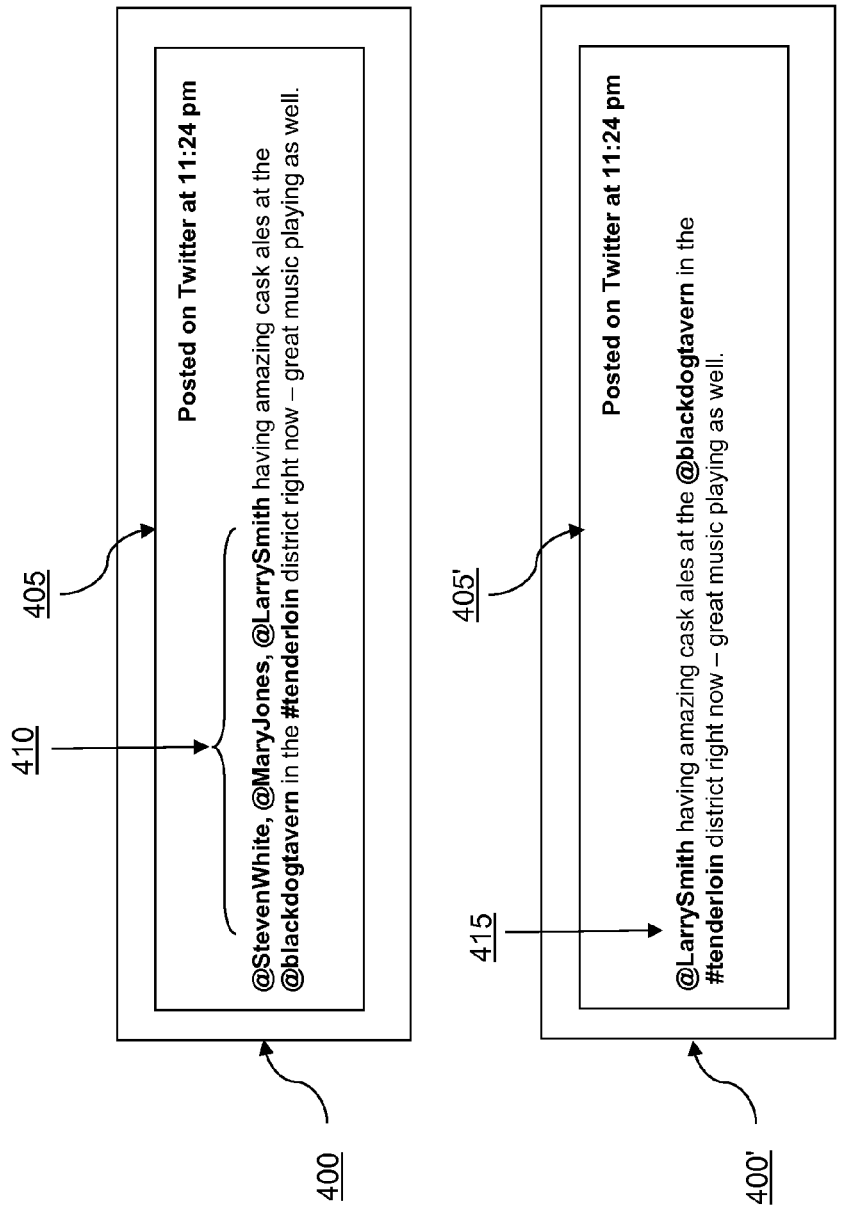
FIG. 4 is an exemplary display of user generated content as processed by various embodiments of the invention.

Referring now to FIG. 4, sample screens 400 and 400' illustrate how the settings described above may be implemented. Screen 400 includes content one or more content items 405 such as Twitter feeds, Facebook status updates, LinkedIn messages, and others. The content may be purely user generated (e.g., text provided by a user typing into an application). In some instances the content from one social network platform may be generated by users within other applications operating on the platforms, such as Pintrest or Spotify, or represent actions taken within applications such as games. As the content is collected, it may include user-specific information such as their Twitter handle, Facebook ID, LinkedIn Id, email address, IM handle, phone number, email address or other information that can be uniquely associated with the user. For example the Tweet 405 regarding beers being served at a local tavern includes three Twitter handles 410 relating to specific individuals (@StevenWhite, @MaryJones and @LarrySmith) and one related to a place (@blackdogtavern). Also included is a subject hashtag #tenderloin that allows users to search for and identify content by subject.

In contrast, screenshot 400' shows how the same content 405 is presented after being scrubbed of the private user data—that is once the privacy settings of each user are considered. In this case, the message that previously included three user identifiers now only includes one—@larrysmith as he is the only user 415' that permitted the aggregation site to republish his user information along with the content 405'. As such, the other users may see the content, and in fact may have even generated the content, but can be sure that their name and/or ID will not be associated with the content outside of the specific platform in which it was generated.

It is understood that the methods and systems described above may contain software and hardware connected to the Internet via a network. Computing devices are capable of communicating with each other via the Internet, and it should be appreciated that the various functionalities of the components may be implemented on any number of devices.

The invention may be practiced using any communications network capable of transmitting Internet protocols. A communications network generally connects a client with a server, and in the case of peer to peer communications, connects two peers. The communication may take place via any media such as standard telephone lines, LAN or WAN links (e.g., T1, T3, 56 kb, X.25), broadband connections (ISDN, Frame Relay, ATM), wireless links (802.11, Bluetooth, 3G, CDMA, etc.), and so on. The communications network may take any form, including but not limited to LAN, WAN, wireless (WiFi, WiMAX), near-field (RFID, Bluetooth). The communications network may use any underlying protocols that can transmit Internet protocols, including but not limited to Ethernet, ATM, VPNs (PPPoE, L2TP, etc.), and encryption (SSL, IPSec, etc.)

The invention may be practiced with any computer system configuration, including hand-held wireless devices such as mobile phones or personal digital assistants (PDAs), multi-processor systems, microprocessor-based or programmable consumer electronics, minicomputers, mainframe computers, computers running under virtualization, etc.

The invention may also be practiced in distributed computing environments where tasks are performed by remote processing devices that are linked through a communications network. In a distributed computing environment, program modules may be located in both local and remote computer storage media including memory storage devices.

The invention's data store may be embodied using any computer data store, including but not limited to, relational databases, non-relational databases (NoSQL, etc.), flat files, in memory databases, and/or key value stores. Examples of such data stores include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

The invention may be practiced using any computer system, which may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between components, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Mac OS operating system, Google Android operating system, Apple iOS operating system, or another operating system or platform.

At a minimum, the memory includes at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool.

The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Basic, C, C++, CSS, HTML, Java, SQL, Perl, Python, Ruby and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, Storage Area Networking devices, solid state drives, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the systems that embody the invention through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

The systems that embody the invention may communicate with the user via notifications sent over any protocol that can be transmitted over a packet-switched network or telecommunications network. By way of example, and not limitation, these may include SMS messages, email (SMTP) messages, instant messages (GChat, AIM, Jabber, etc.), social platform messages (Facebook posts and messages, Twitter direct messages, tweets, retweets, etc.), and mobile push notifications (iOS, Android).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Although internal components of the computer are not shown, those of ordinary skill in the art will appreciate that such components and the interconnections are well known. Accordingly, additional details concerning the internal construction of the computer need not be disclosed in connection with the present invention.

What is claimed is:

1. A method for publishing user-generated content consistent with multiple user-specified privacy settings, the method comprising the steps of:

storing, on a physical memory device, computer-executable instructions for identifying and implementing user-specified privacy settings related to user-generated content and identified users having created the user-generated content; and providing a processor for accessing and executing the instructions, that when executed by the processor (i) collect user-generated content from a plurality of social network platforms; (ii) identify user-specific information for an identified user contained within or associated with the user-generated content; (iii) identify a user-specific privacy policy contained within or associated with the user-generated content for each social network platform where the user-generated content was collected; (iv) apply the user-specified privacy policy to the user-generated content, the policy being associated with the identified user; (v) in response to a request to use the user-generated content on at least one of the social network platforms, alter the user-generated content prior to publication of the user-generated content such that the user-generated content does not violate the user-specified privacy policies and (vi) wherein alteration of the user-generated content comprises removal of one or more elements of user-specific information from the user-generated content such that the user-generated content is displayed without the removed user-specific information and the alteration of the user-generated content comprises removal of a user identifier associated with user-specific information attributable to the user identifier such that the user-generated content is displayed with the removed user-specific information attributable to but without listing the user identifier.

2. The method of claim 1 wherein the user-generated content comprises one or more of a textual comment, an image, or a user identifier.

3. The method of claim 1 wherein the user-specific information comprises one or more of a textual comment, an image, or a user identifier.

4. The method of claim 1 wherein the collection of user-generated content is facilitated by the use of an application programming interface.

5. The method of claim 4 wherein the application programming interface is provided by the respective social network platform.

6. The method of claim 1 wherein the collection of the one or more user-specified privacy policies is facilitated by the use of an application programming interface.

7. The method of claim 6 wherein the application programming interface is provided by the respective social network platform.

8. The method of claim 1 wherein the user-generated content comprises user-specific information attributed to more than one identified user.

9. The method of claim 8 wherein the user-specified privacy policies attributed to the more than one identified user contain dissimilar settings.

10. The method of claim 9 wherein the dissimilar settings differ for respective social network platforms.

11. The method of claim 9 wherein the dissimilar settings differ for respective identified users.

12. The method of claim 9 wherein the dissimilar settings differ for user-generated content.

13. A system for administering a loyalty card program, the system comprising:
 a processor for executing computer-executable instructions; and
 a memory for storing computer-executable instructions, that when executed by the processor implements a privacy policy enforcement application, wherein the privacy policy enforcement application identifies and implements user-specified privacy settings related to user-generated content and identified users having created the user-generated content by:
 (i) collecting user-generated content from a plurality of social network platforms;
 (ii) identifying user-specific information for an identified user contained within or associated with the user-generated content;
 (iii) identifying a user-specific privacy policy contained within or associated with the user-generated content for each social network platform where the user-generated content was collected;
 (iv) applying the user-specified privacy policy to the user-generated content, the policy being associated with the identified user;
 (v) in response to a request to use the user-generated content on at least one of the social network platforms, altering the user-generated content prior to publishing the user-generated content such that the user-generated content does not violate the user-specified privacy policies; and
 (vi) wherein alteration of the user-generated content comprises removal of one or more elements of user-specific information from the user-generated content such that the user-generated content is displayed without the removed user-specific information and the alteration of the user-generated content comprises removal of a user identifier associated with user-specific information attributable to the user identifier such that the user-generated content is displayed with the removed user-specific information attributable to but without listing the user identifier.

14. The system of claim 13 further comprising a data storage module for storing the collected user-generated content and the user-specified privacy settings related to the user-generated content.

15. The system of claim 13 wherein the user-generated content comprises one or more of a textual comment, an image, or a user identifier.

16. The system of claim 13 wherein the user-specific information comprises one or more of a textual comment, an image, or a user identifier.

17. The system of claim 13 further comprising a collection of application programming interfaces, each application programming interface being associated with at least one social network platform and used to collect user-generated content and user-specified privacy policies therefrom.

* * * * *